(12) United States Patent
Nolasco

(10) Patent No.: US 9,796,318 B1
(45) Date of Patent: Oct. 24, 2017

(54) CARRIER WITH LOWERED PLATFORM HEIGHT

(71) Applicants: Pablo Nolasco, Corona, NY (US); Steven Laganas, Merrick, NY (US)

(72) Inventor: Pablo Nolasco, Corona, NY (US)

(73) Assignees: Pablo Nolasco, Deer Park, NY (US); Steven Laganas, Deer Park, NY (US)

( * ) Notice: Subject to any disclaimer, the term of this patent is extended or adjusted under 35 U.S.C. 154(b) by 86 days.

(21) Appl. No.: 14/818,760

(22) Filed: Aug. 5, 2015

(51) Int. Cl.
*B60P 1/30* (2006.01)
*B60P 3/07* (2006.01)
*B60P 3/12* (2006.01)

(52) U.S. Cl.
CPC ...... *B60P 1/30* (2013.01); *B60P 3/07* (2013.01); *B60P 3/122* (2013.01)

(58) Field of Classification Search
CPC .................................. B60P 1/30; B60P 3/122
USPC .................................................. 414/477, 480
See application file for complete search history.

(56) References Cited

U.S. PATENT DOCUMENTS

| | | | |
|---|---|---|---|
| 3,485,400 A | 12/1969 | Pewthers | |
| 4,750,856 A | 6/1988 | Lapiolahti | |
| 4,756,658 A | 7/1988 | Moore et al. | |
| 5,061,147 A | 10/1991 | Nespor | |
| 5,192,189 A * | 3/1993 | Murata | B60P 1/32 414/477 |
| 5,246,329 A * | 9/1993 | Farrell | B60P 3/122 414/478 |
| 5,249,909 A * | 10/1993 | Roberts | B60P 3/122 414/477 |
| 5,871,328 A | 2/1999 | Pinkston | |
| 7,401,860 B2 * | 7/2008 | Kraenzle | B60P 3/122 414/477 |
| 8,070,411 B2 | 12/2011 | Jaeger et al. | |
| 8,348,586 B2 | 1/2013 | Jaeger et al. | |
| 8,371,798 B2 | 2/2013 | Jaeger et al. | |
| 8,376,683 B2 | 2/2013 | Jaeger et al. | |

FOREIGN PATENT DOCUMENTS

| | | | | |
|---|---|---|---|---|
| FR | 2686843 A1 * | 8/1993 | ................ | B60P 3/12 |
| GB | 2259688 A * | 3/1993 | ................ | B60P 1/32 |

* cited by examiner

*Primary Examiner* — James Keenan
(74) *Attorney, Agent, or Firm* — Alfred M. Walker

(57) ABSTRACT

A tow truck carrier with sub frame rails above the carrier chassis frame rails that also reduces platform height thereby presenting a lower center of gravity. Sub frame rails of rectangular steel tubing with the wider dimension of the tubing are used in a horizontal, low profile orientation, with the direct attachment of the lift cylinder ends to the sub frame rails or to a cross beam to lower the platform. The sub frame rails form a descending ladder frame with cross members attached via brackets so that they are lowered into the recess between the chassis side frame. A lifting bracket is welded to the underside of each sub frame rail underneath the overhang and adjacent to the chassis frame to accept the end of a lifting cylinder rod while leaving some space for sliding engagement of a platform beam which engages three edges of the sub frame rail.

12 Claims, 10 Drawing Sheets

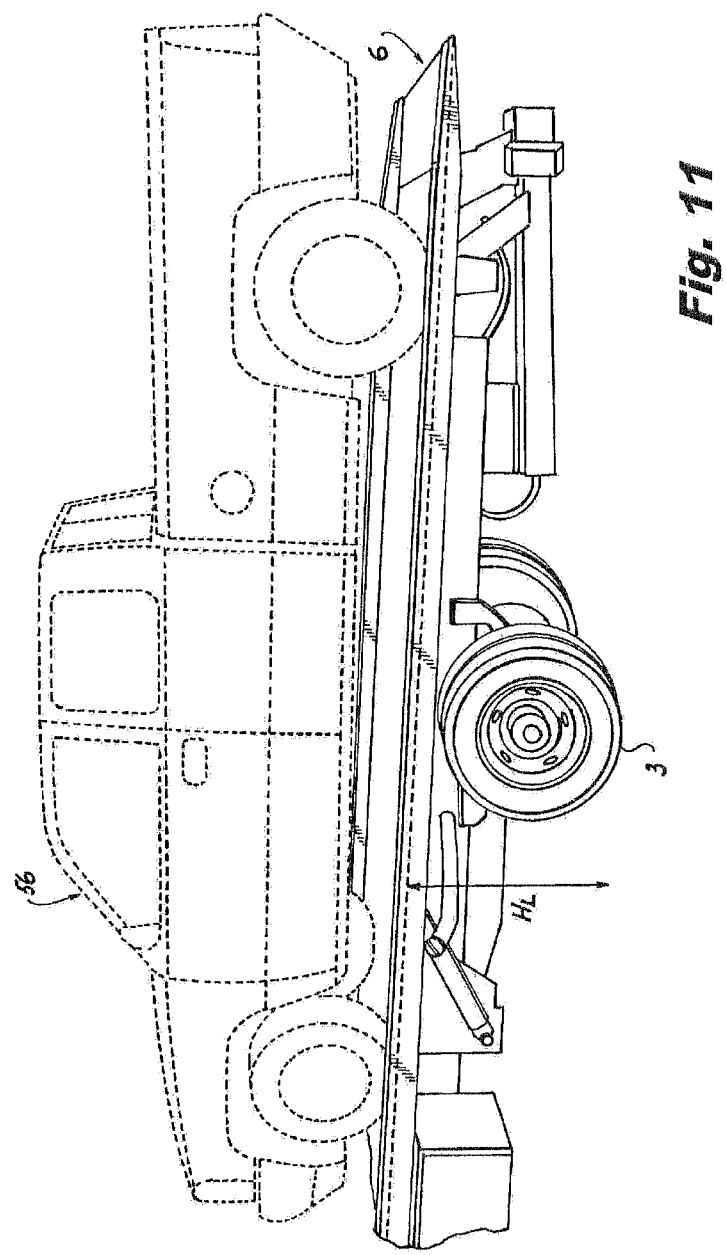

CARRIER WITH LOWERED PLATFORM HEIGHT

FIELD OF THE INVENTION

The present invention relates to tow truck carriers with lowered platform height and lower center of gravity.

BACKGROUND OF THE INVENTION

The present invention relates to tilting platform carriers in which the platform also slides in relation to the vehicle frame. These carriers are most often used to pick up and carry disabled vehicles transporting them to repair centers; they may also be used to transport industrial and agricultural equipment.

The basic motion of the platform relative to the truck frame is well illustrated in U.S. Pat. No. 3,485,400 of Pewthers. FIGS. 1-3 show the sequence of starting with the platform in a horizontal forward transporting position, to sliding the platform rearward, and finally raising the front of the platform with a hydraulic cylinder pivoting its distal overhanging end to ground contact. While these basic moves do not equate to modern carriers with additional disabled vehicle handling equipment, other patents in the prior art do relate to them.

Examples of patents relating to carriers of the present invention include the following: the Car Carrier of Lapiolahti (U.S. Pat. No. 4,750,856), Disabled Car Carrier Vehicle of Moore et al. (U.S. Pat. No. 4,756,658), Vehicle Carrier With Wheel Lift of Nespor (U.S. Pat. No. 5,061,147), and Wrecker Truck With Sliding Deck of Pinkston (U.S. Pat. No. 5,871,328). None of these prior art patents relate specifically to the objective of lowering the platform height.

The patent of Jaeger et al. entitled Low Center Of Gravity Carrier (U.S. Pat. No. 8,348,586) does meet this objective by moving the sub frame rails (which support the tilting platform and permit its sliding action) from above the vehicle frame rails sideways to between the chassis frame rails and the rear wheels. The bottoms of these sub frame rails are also moved down below the top surface of the adjacent chassis frame to reduce platform height.

The prior art does not reveal a carrier with sub frame rails above the carrier chassis frame rails that also reduces platform height thereby offering the associated advantages of lower center of gravity for better dynamic road handling, shallower load angle, and an increase in maximum payload height.

SUMMARY OF THE INVENTION

As opposed to the prior art, the present invention uses sub frame rails of rectangular steel tubing with the wider dimension of the tubing used in a horizontal (low profile) orientation. By itself, this change lowers the platform several inches. Other changes such as the direct attachment of one or more lift cylinder ends to the sub frame rails as opposed to using a lifting crossbar underneath the sub frame rails account for further lowering.

The sub frame rails form a true ladder frame with cross members attached via brackets so that they are lowered into the recess between the chassis side frame. The space between the top surface of the sub frame rails and the tops of the cross members is well utilized to house both the platform sliding cylinder as well as the carrier chain, such as an Igus Energy Chain™, guiding and protecting hydraulic hoses and cables.

The sub frame rails are wider than the top surface of the chassis frame; they are aligned so that their inner edge is aligned with the inner edge of the chassis frame members and their outer edges overhang by a few inches. A lifting bracket is welded to the underside of each sub frame rail underneath the overhang and adjacent to the chassis frame to accept the end of a lifting cylinder rod while leaving some space for sliding engagement of a platform beam which engages three edges of the sub frame rail. This direct bracket attachment also minimizes the height of the platform surface. When the platform is in the horizontal (transporting) position, the sub frame can actually rest atop the carrier chassis frame side members with no wasted space between. While the preferred embodiment has a pair of lift cylinders, it is noted that one or more lift cylinders can be employed in lifting the vehicle or other load supporting platform.

BRIEF DESCRIPTION OF THE DRAWINGS

The present invention can best be understood in connection with the accompanying drawings. It is noted that the invention is not limited to the precise embodiments shown in the drawings, in which:

FIG. 1 is a rear elevation of a prior art carrier with a normal (higher) platform height;

FIG. 2 is a rear elevation of a prior art carrier which achieves a lower platform height using techniques different from the present invention;

FIG. 3 is a rear elevation of a lower platform height carrier of the present invention;

DETAILED DESCRIPTION OF THE INVENTION

The salient features dictating differences in platform height and means by which they are achieved is illustrated by the various figures that follow. Obvious means such as attempts to use smaller wheels or high strength steel to reduce platform thickness or height of carrier chassis side frame members will not be discussed as the economics dictate that the starting point for such vehicle carriers as these is a "standard" flatbed truck chassis as supplied by a major manufacturer.

Figure 1:
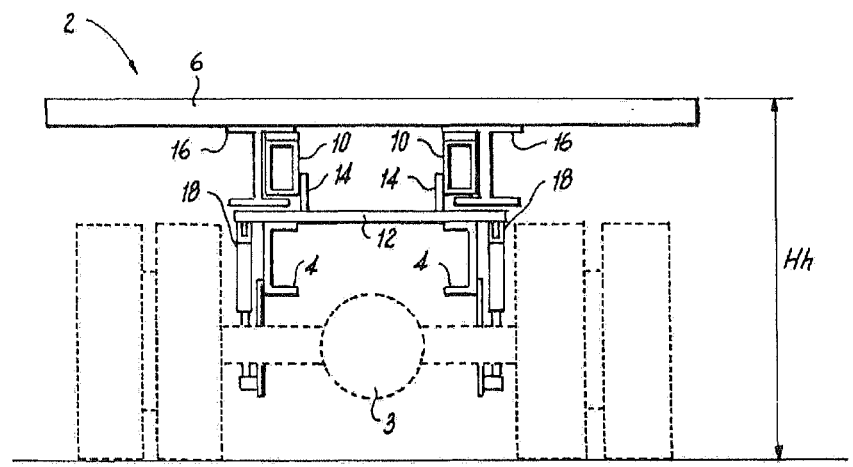
FIGS. 1-3 are schematic rear elevations of carriers comparing and contrasting the elements directly affecting the platform height while in the horizontal position. All three figures are assumed to have the same carrier chassis frame position and rear axle.
Figure 2:
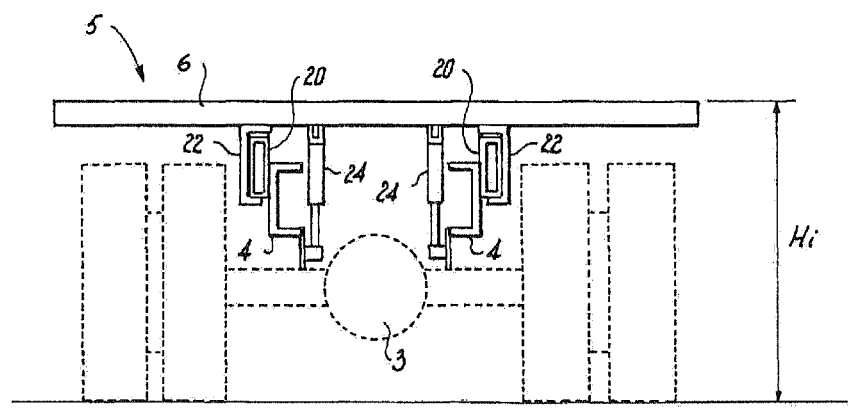
Figure 3:
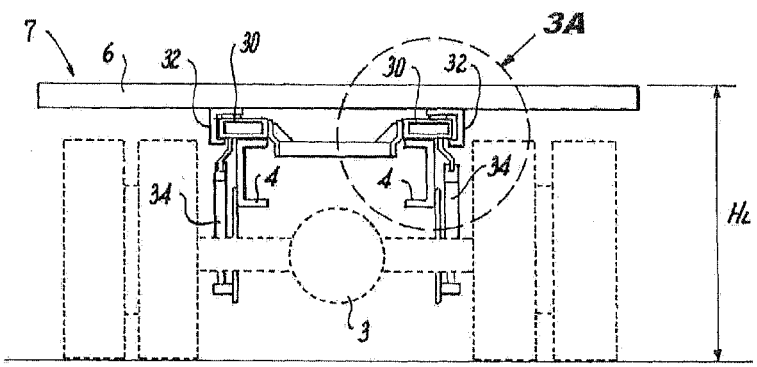

FIGS. 1-3 compare the differences in structural elements used in two prior art carriers as compared and contrasted with those of the present invention. These are mere rear view schematic illustrations leaving out essential items such as cross members tying together sub frame rails to clarify the images of elements directly involved in platform height determination. The same truck chassis with rear axle 3 and side frame members 4 is assumed in each case.

FIG. 1 shows a prior art carrier 2 using two upright sub frame rails 10 which lift platform 6 tilting it down toward the rear for loading and unloading. Hydraulic cylinders 18 are the lift cylinders lifting the front of sub frame 10 rails through lifting bar 12 which is attached by brackets 14. Rails 10 have a wear strip attached to the top surface to provide a low friction sliding surface which interacts with I-beams 16 enclosing three sides of sub frame rails 10. I-beams 16 are attached longitudinally to the underside of platform 6 and provide a sliding surface. It is noted that brackets 14 must provide clearance between lifting bar 12 and the lower flange of I-beams 16. While these parts work well in providing a secure attachment and proper articulation of platform 6 relative to carrier 2, the platform height Hh is not as low as can be achieved. More details are shown in FIGS. 4 and 5.

Figure 4:
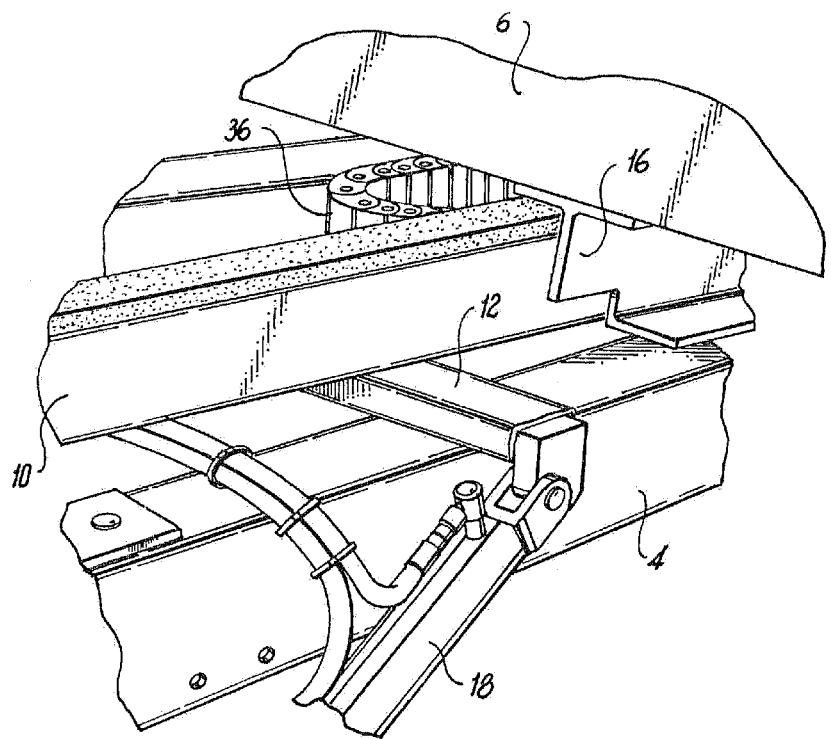
FIG. 4 is a perspective detail of a normal (higher) platform height prior art carrier showing one of the two sub frame rails horizontal atop a lifting crossbar atop the chassis frame.

For example, FIG. 4 shows sub frame in horizontal position with lifting bar 12 resting on frame 4. Hose carrier chain 36 is shown housed between sub frame rails 10.

Figure 5:
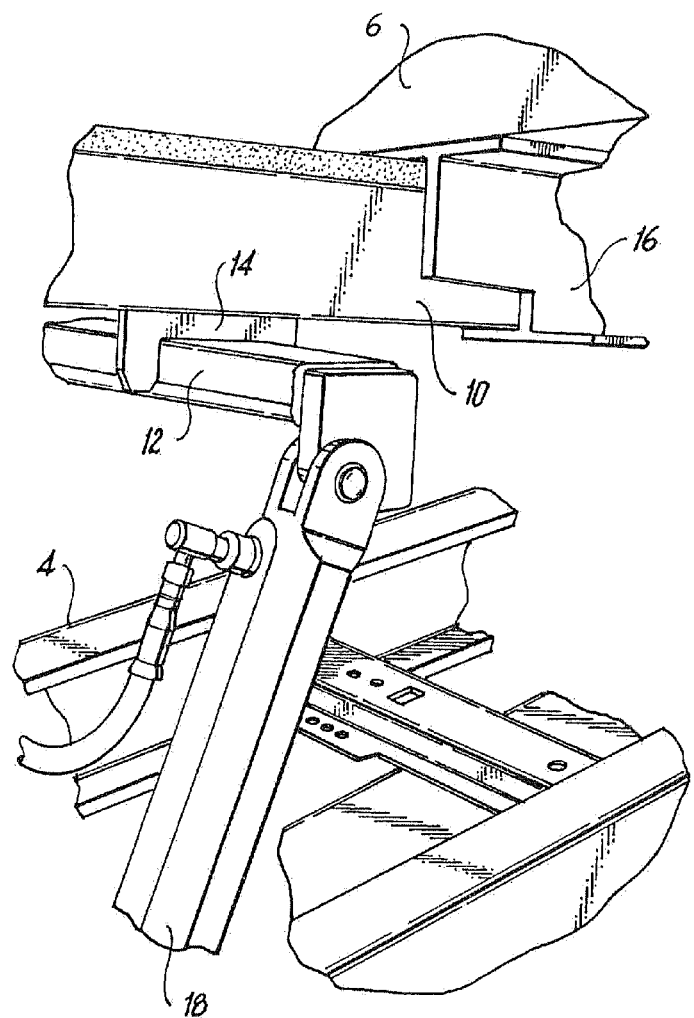
FIG. 5 is a perspective detail of the same region of a prior art carrier as in FIG. 4, but the sub frame rail is now raised by the hydraulic cylinder.

FIG. 5 shows sub frame raised revealing attachment of I-beam 16 to underside of the platform; lifting bar bracket 14 shows spacing between bar 12 and sub frame rail 10 to provide clearance for the lower flange of I-beam 16.

FIG. 2 shows the prior art carrier 5 which moves the upright sub frame rails 20 outward to the side of carrier frame 4 and lower with their lower surface below the top surface of frame 4 members. Some inner side space of sub frame beams 20 must be reserved above the top of chassis frame members 4 to attach cross members (not shown in this view); this limits the amount by which rails 20 can be lowered. U-beams 22 attached longitudinally to the underside of platform 6 enclose three sides of sub frame beams 20 providing a sliding engagement. It is noted that the crowding between frame 4 and the rear wheels almost dictates moving hydraulic lift cylinders 24 to a center position as shown between frame 4 members. The platform height Hi is reduced several inches as compared to carrier 2 of FIG. 1.

FIG. 3 shows the lowered platform height carrier 7 of this invention. It uses a pair of sub frame rails 30 with their larger crossection dimension in the horizontal (low profile) orientation atop chassis frame members 4. Rails 30 are aligned with the inner edge of frame 4 members on the inside, but preferably overhang the top of frame 4 on the opposite side. This overhang provides space for direct attachment of cantilevered brackets for hydraulic lift cylinders 34 and also for engagement slider elements, such as, for example, provided on three sides of U-beams 32 attached longitudinally to the underside of platform 6, thereby locating platform 6 onto the rails 30 in a sliding assembly. U-beams 32 cradle an outer edge of sub-frame rails 30 on three sides in a spaced apart relationship, so that low friction wear strip 40, which is attached to the outer top edge of sub-frame rails 30, can provide a sliding surface for the top edge of U-beams 32. As also shown in FIG. 3, platform 6 has a height $H_L$, which is several inches lower than the height Hh of the prior art of FIG. 1.

Figure 3A:
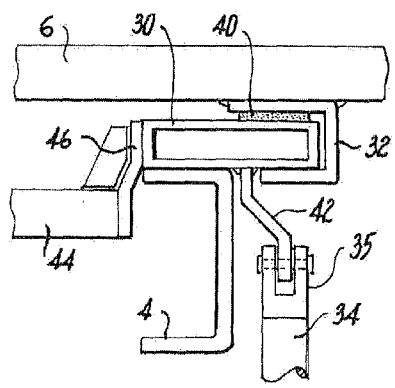
FIG. 3A is an enlarged detail of part of FIG. 3.

FIG. 3A is an enlarged detail of the right side sub frame and associated items shown in FIG. 3. It is easier to understand the arrangement permitting resting of sub frame rail 30 on chassis frame 4 while functioning as required. It is noted that cross members 44 are dropped down to a space below the top of chassis frame member 4 via welded drop brackets 46 (this is also shown in the view in FIG. 8). Removable low friction wear strip 40 is attached to the top surface of sub frame rail 30 adjacent the outer edge thereof, so that low friction wear strip 40 provides a sliding surface under top flange of U-beam 32, so that vehicle towing support platform 6 and U-beam 32 attached thereto, can slide on low friction wear strips 40 and sub-frame rails 30 during towing operations. Cantilevered cylinder bracket 42 is welded to the underside of rail 30 adjacent to the side of chassis frame 4, and is bent outward as shown, for providing clearance sliding space for the lower flange of U-beam 32 to securely engage the lower surface of the end of rail 30 thereby straddling three surfaces of the overhanging rail end. Rod clevis 35 of hydraulic cylinder 34 is pivoted on bracket 42. The hydraulic cylinder 34 exerts force upward via bracket 42 connected to sub-frame rail 30, to lift platform 6, as well as sub-frame rail 30, connected via drop down bracket 46, which is connected to cross member 44, which is connected to a mirror-image assembly on the left side sub-frame (not shown). Cross member 44 insures that the left side assembly acts in unison with the right side assembly shown in FIG. 3A.

Figure 3B:
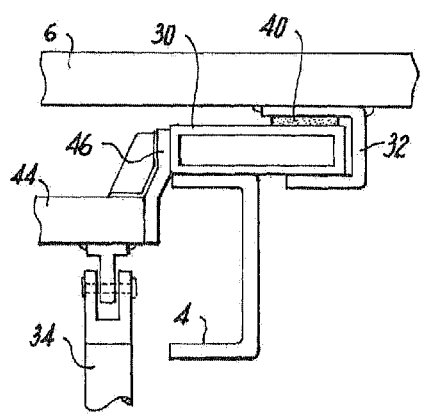
FIG. 3B is an enlarged detail of an alternate embodiment for FIG. 3.

FIG. 3B is an enlarged detail of the lifting portion for the carrier shown in FIGS. 3 and 3A, except that the lifting force of the hydraulic cylinders 34 is shifted inward of chassis frame rails 4 and is exerted against cross member 44 and drop down brackets 46 connected to sub-frame rails 30, and, as also shown in FIG. 3A, sub-frame rails 30 also have removable low friction wear strip 40, which is attached to the top surface of sub frame rail 30 adjacent the outer edge thereof, so that low friction wear strip 40 also provides a sliding surface under top flange of U-beam 32, so that vehicle towing support platform 6 and U-beam 32 attached thereto, can slide on low friction wear strips 40 and sub-frame rails 30 during towing operations. As in FIG. 3A, in FIG. 3B, cross member 44 insures that the left side assembly acts in unison with the right side assembly shown in FIG. 3B. In this embodiment of FIG. 3B, cylinder brackets 43 are welded to the underside of cross member 44. Use of the lifting assembly as in FIG. 3B can be used if the fuel tank is not located between chassis rails 4, which allows the space then for positioning the lifting cylinders 34 to the inside of chassis frame rails 4.

Figure 3C:
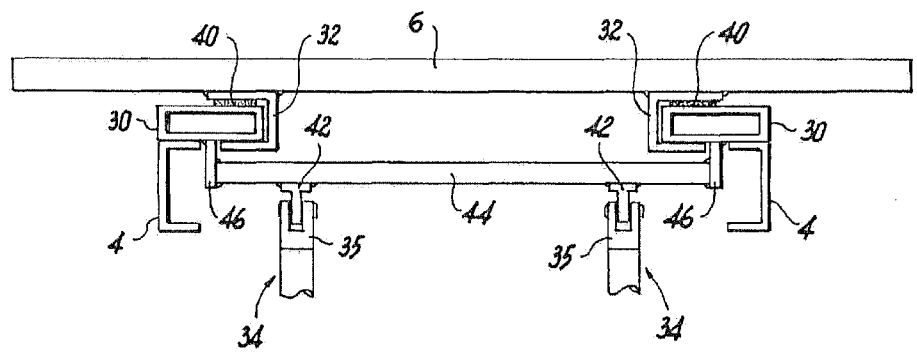
FIG. 3C is an enlarged detail view of a further alternate embodiment for the rear view of FIG. 3.

FIG. 3C is an enlarged detail view of an alternate embodiment for the rear view of FIG. 3, showing left and right sub frames 30 and associated items. Cross member 44 is positioned below the top of chassis frame members 4, and inside and between the location of the two sets of tires on each side of the towing vehicle, which are shown in FIG. 3. As in the embodiment of FIG. 3B, hydraulic cylinders 34 are placed inward of chassis frame rails 4.

Unlike FIGS. 3A and 3B, where the U-beam nests over the outside portion of sub frame rail tube 30, in FIG. 3C, the respective U-beams 32 of FIG. 3C are instead relocated to nest over the inside portion of sub frame rail tube 30, adjacent to an inner edge thereof. Sub frame rails 30 each have low friction wear strips 40 to provide a sliding surface under a top flange of U-beams 32, so that vehicle support platform 6 and U-beams 32 attached thereto, can slide on low friction wear strips 40 and sub frame rails 30 during towing operations. Hydraulic cylinders 34 each have a respective pivotable pin clevis 35, which is attached via cylinder brackets 42 to lift cross member 44. Cross member 44 is attached to the underside of each sub frame rail tube 30 via welded straight drop down brackets 46.

Figure 3D:
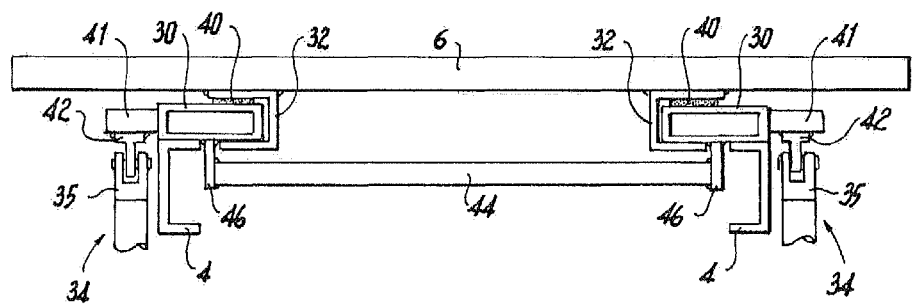
FIG. 3D is an enlarged detail view of another further alternate embodiment for the rear view of FIG. 3.

FIG. 3D is an enlarged detail view of yet an alternate embodiment for the rear view of FIG. 3, showing left and right sub frames 30 and associated items. Cross member 44 is positioned below the top of chassis frame members 4, and inside and between the location of the two sets of tires on each side of the towing vehicle, which are shown in FIG. 3. However in the embodiment of FIG. 3D, although the sub frame rail tubes 30 are on top of chassis frame members 4, and not located on the side of chassis frame members 4 between chassis frame members 4 and the wheels of the vehicle, hydraulic cylinders 34 are placed outside of chassis frame rails 4.

Unlike FIGS. 3A and 3B, where the U-beam nests over the outside portion of sub frame rail tube 30, in FIG. 3D, the respective U-beams 32 of FIG. 3D are instead relocated to nest over the inside portion of sub frame rail tube 30, adjacent to an inner edge thereof. Sub frame rails 30 each have low friction wear strips 40 to provide a sliding surface under a top flange of U-beams 32, so that vehicle support platform 6 and U-beams 32 attached thereto, can slide on low friction wear strips 40 and sub frame rails 30 during towing operations. Hydraulic cylinders 34 each have a respective pivotable pin clevis 35, which is attached via cylinder brackets 42 being attached by bracket extension 41 to left and right sub frame rail tubes 30 located on top of chassis frame members 4 to lift support platform 6. Cross member 44 is attached to the underside of each sub frame rail tube 30 via welded straight drop down bracket 46.

It is known that the position of U-beams 32 can be located on either side of sub frame rail tubes 30, which are located on top of, and not beside chassis frame members 4, and the position of hydraulic cylinders can be located in other combinations, as long as sub frame rail tubes 30 are located on top of chassis frame members 4.

When sub frame rail tubes 30 are raised, they convey this motion to vehicle support platform 6 through U-beams 32 during lifting of a vehicle for transport.

Figure 6:
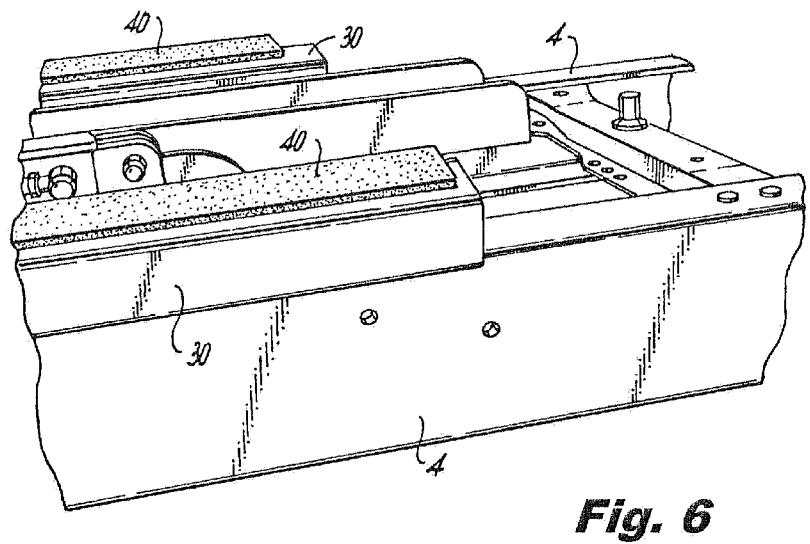
FIG. 6 is a perspective detail of current invention showing the outer edge of a sub frame rail overhanging the outer edge of a chassis frame, and also showing the attached wear strip on top.

FIG. 6 shows a close-up of the end of sub frame rail 30 resting atop side frame member 4 while overhanging the outer edge of frame 4. Optional wear strip 40 attached to the top outer edge of sub frame rail may be greased to further lower the coefficient of friction with the mating U-beam 32, of FIGS. 3 and 3A, attached to platform 6 as the two surfaces slide.

Figure 7:
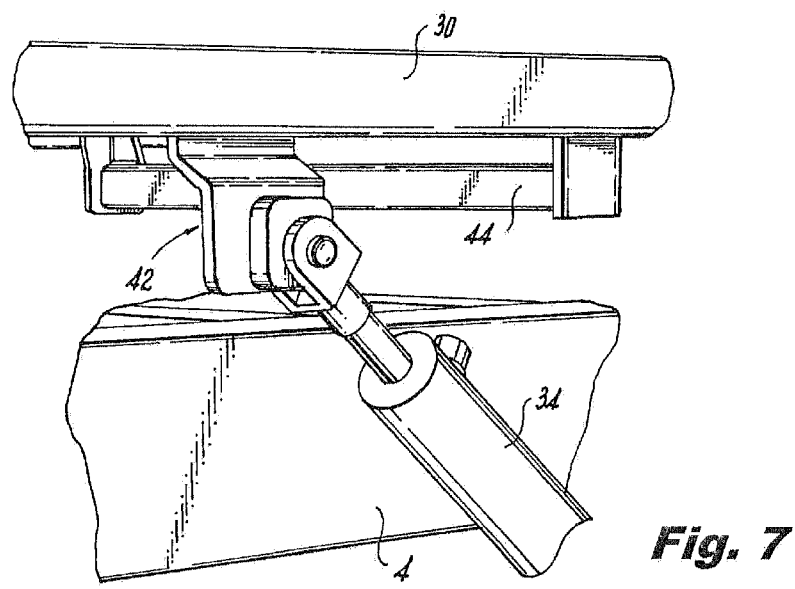
FIG. 7 is a perspective detail showing a slightly raised sub frame rail, a hydraulic lift cylinder, and a cantilevered cylinder top bracket welded to the overhanging underside of one of the sub frame rails.

FIG. 7 shows a close-up of the cantilevered bracket 42 that pivotally attached to the clevis 35, shown in FIG. 3A, at the end of the rod of lifting hydraulic cylinder 34. Bracket 42 is welded to sub frame rail 30 on the bottom surface adjacent to the outer side of frame 4, shown in FIGS. 3, 3A and 6, thereby also providing clearance for the lower flange of U-beam 32 to slide by.

Figure 8:
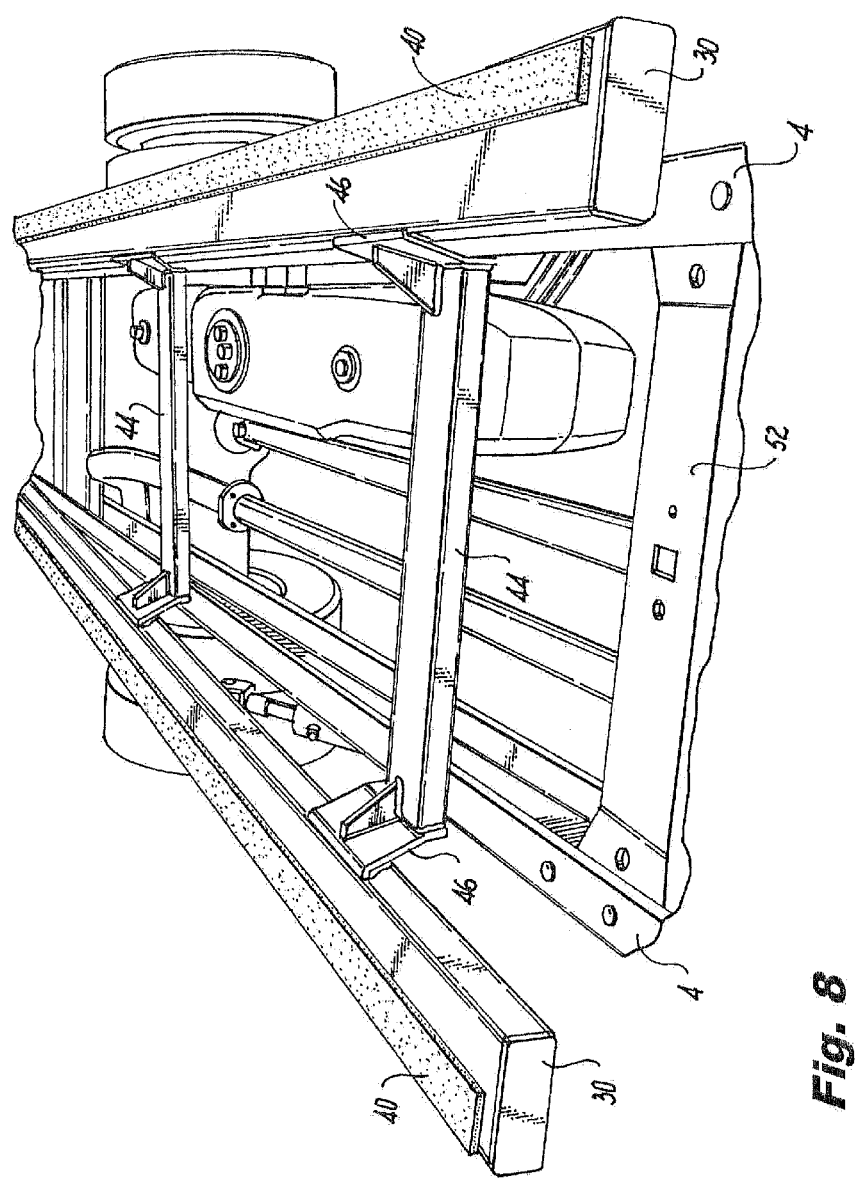
FIG. 8 is an end perspective view of the two sub frame rails during assembly showing the cross members attached via drop down brackets forming a true ladder frame.

FIG. 8 shows an end view of the two sub frame rails 30 attached together by cross members 44 via drop down brackets 46 forming a rigid ladder frame. Carrier chassis cross member 52 is also in this view.

Figure 9:
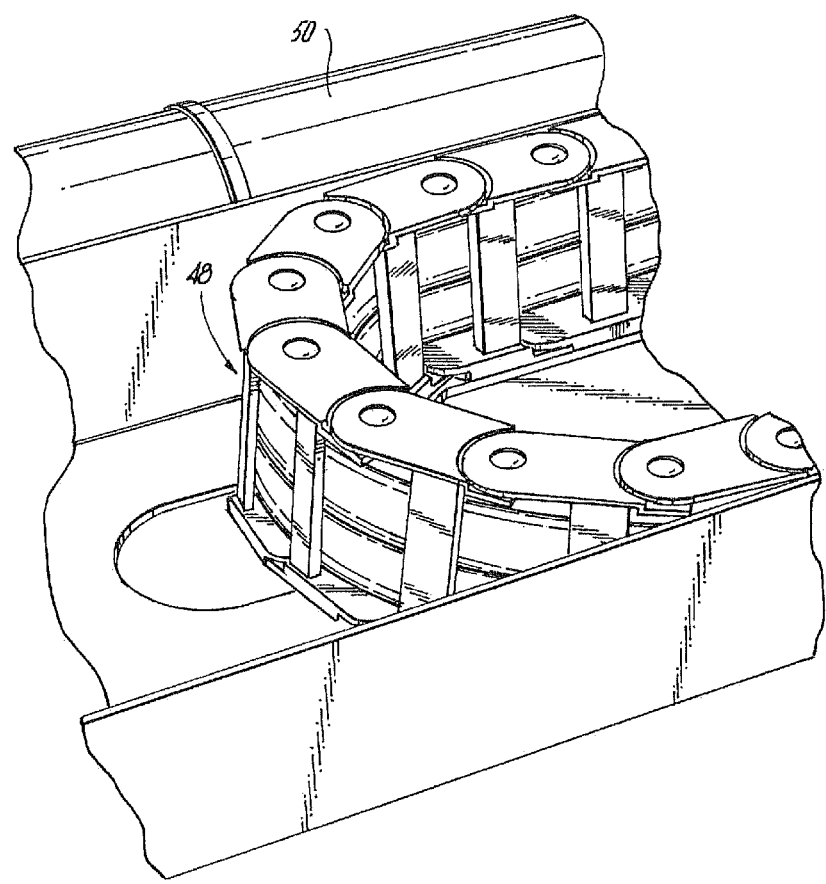
FIG. 9 is a perspective detail showing part of the carrier chain for hydraulic hoses as well as part of the platform sliding hydraulic cylinder; both share the space between and under the two sub frame rails above the cross members.
Figure 10:
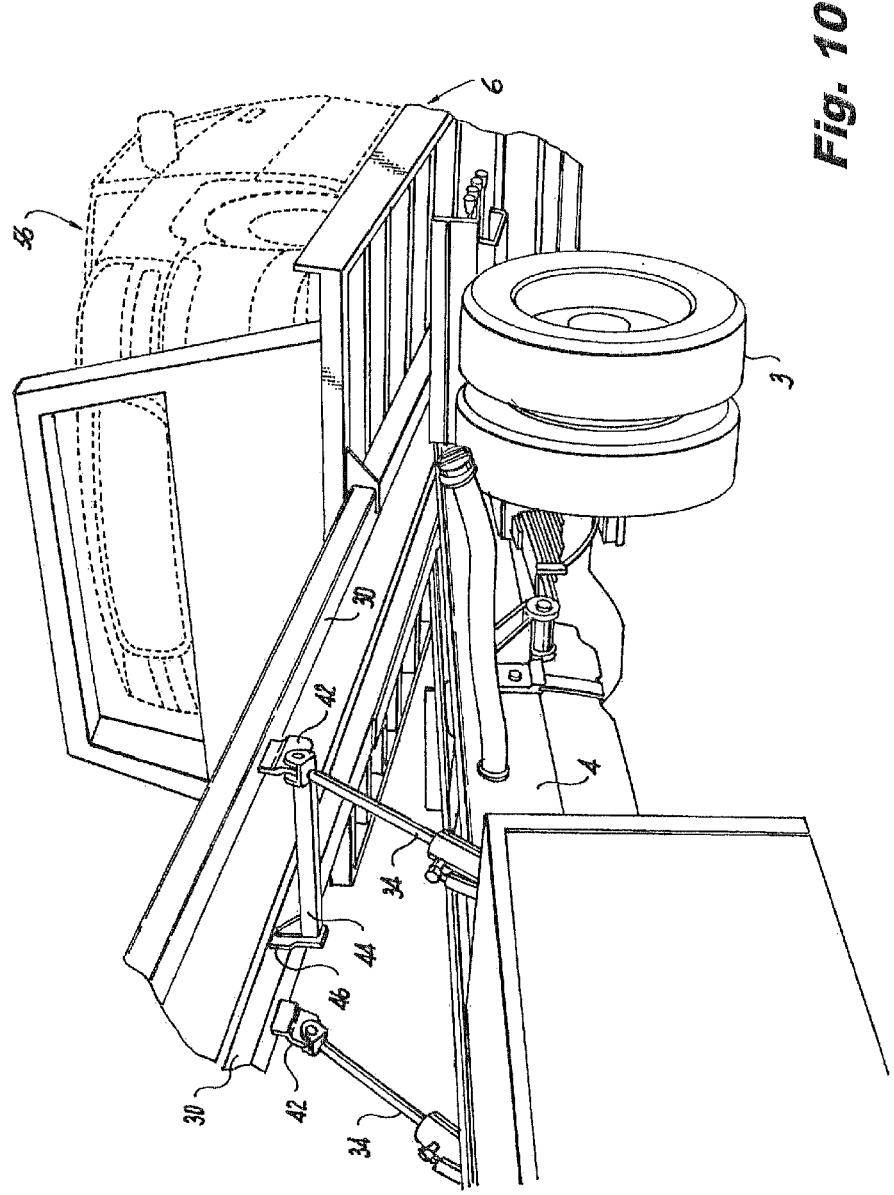
FIG. 10 is a perspective view of the platform with vehicle on top, platform at an angle in the rearward position, and hydraulic lifting cylinders extended; and, FIG. 11 is a perspective side view of a carrier platform in a horizontal position with vehicle in transporting position atop platform; platform height is indicated.

As shown in assembly FIG. 9, the space under platform 6 and above cross members 44, shown in FIGS. 3A and 10, is used to house hydraulic hose carrier chain 48 as well as platform sliding cylinder 50; these items must move with the sub frame.

FIG. 10 shows a partial view of carrier 7 looking rearward with platform 6 at ground level at the rear and hydraulic lift cylinders 34 extended. This depicts the position for loading or unloading carried vehicle 56.

FIG. 11 shows a side view of the back end of carrier 7 showing carried vehicle 56 on platform 6. Lowered platform 6 height $H_L$ in this transporting configuration is indicated.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A vehicle carrier for loading and unloading vehicles comprising:
   said vehicle carrier having a rear axle and a platform for supporting a vehicle above said rear axle, said platform extending from an end forward of said rear axle to a rear of said rear axle;
   a main chassis frame comprising a pair of spaced, parallel chassis frame rails, each with an upper wall surface;
   a movable sub frame comprising a pair of spaced, parallel sub frame rails, each sub frame rail rectangular in crossection, with larger crossection dimensions in a horizontal orientation than in a vertical crossection dimension forming a low profile;
   each of said sub frame rails resting on said upper wall surface of each of said main frame chassis frame rails, a portion of each of said sub frame rails extending past and overhanging one side of each of said main frame chassis frame rails;
   a U-channel straddling one side of each sub frame rail;
   a low friction wear strip between a top surface of said sub frame rail and an upper leg of each said U-channel allowing sliding movement of said U-channel on each said sub frame rail;
   a lower leg of said U-channel extending under said overhanging portion of said sub frame rail;
   said platform having a forward end resting on and attached to upper surfaces of said upper legs of said U-channel whereby said platform and U-channels are movable together along each respective said sub frame rail;
   said movable sub frame comprising spaced cross members joining said sub frame rails together, via first drop down brackets, thereby positioning said cross members below said upper wall surface of said main chassis parallel frame rails, thereby reducing the height of said platform for supporting vehicles thereon, and at least one hydraulic cylinder for raising a forward end of said platform to allow said platform to tilt with a rearward edge thereof touching a ground surface whereby said vehicle is loaded on or offloaded from said platform;

whereby the low profile of said sub frame in a travel configuration results in a lower center of gravity of said vehicle carrier for better dynamic handling, and a decrease in platform height while providing a shallower load angle as compared to a vehicle carrier of a higher profile subframe.

2. The vehicle carrier of claim 1 in which said at least one hydraulic cylinder comprises a pair of hydraulic cylinders.

3. The vehicle carrier of claim 2 in which a descending cantilevered further drop down bracket is attached at an upper end thereof to each overhanging surface of each sub flame rail, a lower end of each said descending cantilevered further drop down bracket being attached to a lifting rod extending from each hydraulic cylinder using a clevis for allowing pivoting of said hydraulic piston rod with respect to said descending cantilevered bracket as said platform is pivoted.

4. The vehicle carrier of claim 3 in which one vertical edge of each sub frame rail being aligned with an inner edge of the chassis frame rail underneath.

5. The vehicle carrier of claim 4 in which each of said spaced cross members is attached to said sub frame rail using said first drop down bracket attached at an upper end to said one vertical edge of said sub frame rail and a lower end thereof attached to said cross member so that said cross members are in a recess between said chassis frame members when said platform is in a resting position leaving space above said cross members for other operating equipment.

6. The vehicle carrier of claim 3 in which an upper end of said cantilevered further drop down bracket is attached to an underside of said sub frame rail at a point between a vertical wall of said chassis frame rail and a distal end of a lower leg of said U-channel for providing clearance sliding space for said lower leg of said U-channel to securely surround a portion of an end of said sub frame rail.

7. The vehicle carrier of claim 2 wherein said hydraulic cylinders are engaged with an underside of one of said cross members between said sub frame rails.

8. The vehicle carrier of claim 7 in which one vertical edge of each sub frame rail being aligned with an outer edge of the chassis frame rail underneath.

9. The vehicle carrier of claim 7 in which one vertical edge of each sub frame rail being aligned with an inner edge of the chassis frame rail underneath.

10. The vehicle carrier of claim 2 wherein said hydraulic cylinders are located outside of said chassis frame rails, said sub frame rails having, side extensions welded to outer ends of said sub frame rails, respective cylinder cantilevered drop down brackets welded to bottoms of said side extensions to communicate with a clevis of said hydraulic cylinders.

11. The vehicle carrier of claim 10 in which one vertical edge of each sub frame rail being aligned with an outer edge of the chassis frame rail underneath.

12. The vehicle carrier of claim 1 in which said sub frame rails are constructed of rectangular steel tubing.

* * * * *